Sept. 10, 1929.  L. JARVIS  1,727,648
SCYTHE BLADE
Filed Sept. 1, 1923
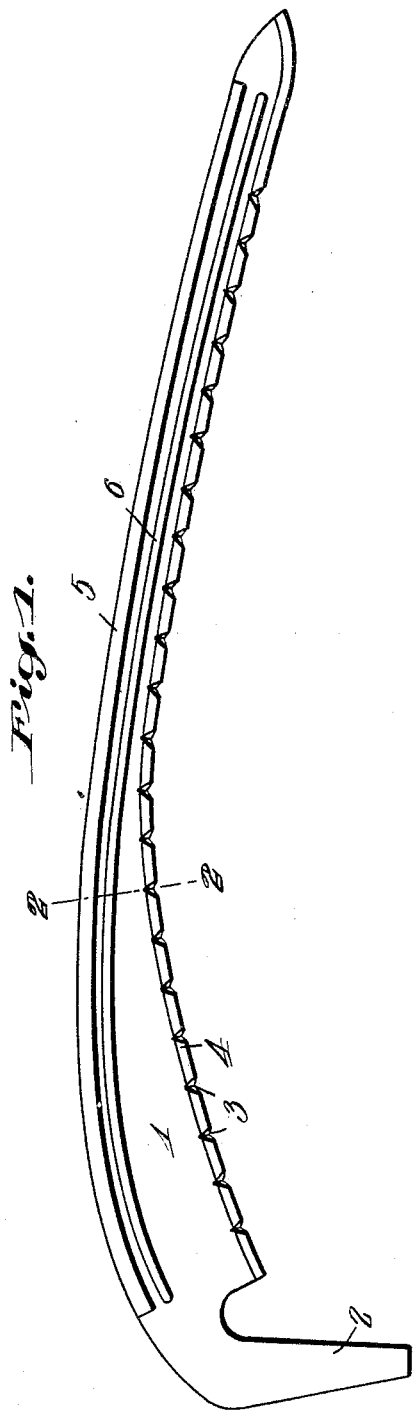
L. Jarvis, Inventor Patented Sept. 10, 1929.

1,727,648

UNITED STATES PATENT OFFICE.

LEVI JARVIS, OF CEDAR RAPIDS, NEBRASKA.

SCYTHE BLADE.

Application filed September 1, 1923. Serial No. 660,549.

This invention relates to scythe blades and the object thereof is to provide a blade equipped with means to prevent its sliding over the grass without cutting and which will effectively cut grass when the edge of the blade is comparatively dull.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

In the accompanying drawings:—

Figure 1 represents a side elevation of a blade constructed in accordance with this invention; and Fig. 2 is a transverse section thereof taken on the line 2—2 of Fig. 1.

In the embodiment illustrated a scythe blade 1 is shown having the usual shank 2 at its inner end for attachment to a snath. This blade 1 is provided along its cutting edge with a plurality of longitudinally spaced notches 3 having sharpened edges 4. These notches 3 are made V-shaped so that the stems or blades of grass will be held in the apices thereof so that the grass will be cut and prevent possibility of the blade sliding over it without cutting. This V-shaped formation of the notches also adapts the blade to cut while having a comparatively dull edge which would not be possible were the notches not provided.

The blade 1 is equipped along its rear edge with the usual reinforcing rib 5 and has a similar rib 6 arranged longitudinally at a point spaced inwardly from rib 5.

Various changes changes in the form, shape, proportion and other minor details of construction may be made without departing from the principle or sacrificing any of the advantages of the claimed invention.

I claim:—

A scythe blade including an elongated body portion having an integral shank at one end and having a wide portion adjacent to the shank defining a curved cutting edge, the cutting edge of the body portion having notches therein, the notches being arranged in spaced relation with each other, the side edges of the notches being beveled defining cutting edges, and ribs formed adjacent to the opposite edge of the body portion.

In testimony that I claim the forgoing as my own, I have hereto affixed my signature.

LEVI JARVIS.